United States Patent [19]
Tovi

[11] Patent Number: 5,099,360
[45] Date of Patent: Mar. 24, 1992

[54] LAMINATED BEAM SPLITTING OPTICAL SYSTEM WITH REFLECTIVE MEDIUM

[75] Inventor: Murray Tovi, Colorado Springs, Colo.

[73] Assignee: Theoretical Optics, Inc., Colorado Springs, Colo.

[21] Appl. No.: 636,499

[22] Filed: Dec. 31, 1990

Related U.S. Application Data

[63] Continuation-in-part of Ser. No. 540,575, Jun. 15, 1990, which is a continuation of Ser. No. 362,691, Jun. 7, 1989, Pat. No. 4,934,792.

[51] Int. Cl.⁵ .................. G02B 27/00; G02C 7/10
[52] U.S. Cl. ...................... 359/601; 359/900; 351/44
[58] Field of Search ........... 350/320, 417, 132, 276 R, 350/451, 452; 351/44, 45, 165

[56] References Cited

U.S. PATENT DOCUMENTS

| | | | |
|---|---|---|---|
| 1,771,451 | 7/1930 | Suzuki et al. | 351/165 |
| 2,409,356 | 10/1946 | Hutchings | 351/165 |
| 4,315,665 | 2/1982 | Haines | 351/44 |
| 4,320,940 | 3/1982 | Mueller et al. | 351/165 |
| 4,657,354 | 4/1987 | Kobayashi | 350/417 |
| 4,715,702 | 12/1987 | Dillon | 351/165 |

*Primary Examiner*—Scott J. Sugarman
*Assistant Examiner*—James Phan
*Attorney, Agent, or Firm*—Richard W. Hanes

[57] ABSTRACT

A method of coloring a glass optical structure comprising providing a first glass plate member having a smooth exterior surface and an interior surface, applying a transparent paint layer to said interior surface, providing a clear layer of flowable plastic over said paint layer so that said flowable plastic fills any variations in said paint layer, and prevents optical distortion in said structure, and applying a second glass member having a smooth exterior surface and an interior surface adjacent said flowable layer. In structural form, the optical system comprises a four-layered optical structure. The flowable plastic corrects any optical distortions created by variations in the paint layer.

9 Claims, 6 Drawing Sheets

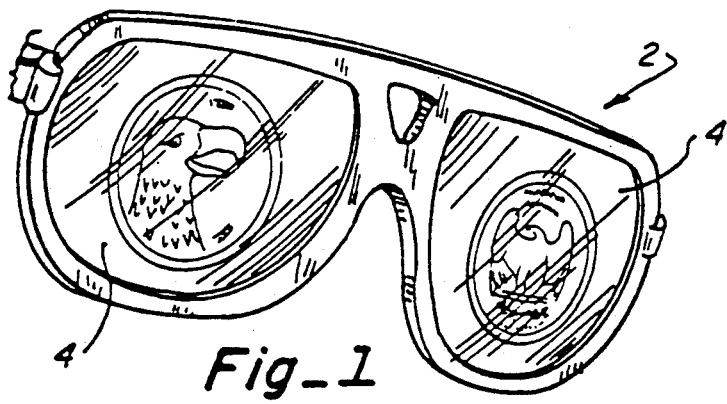
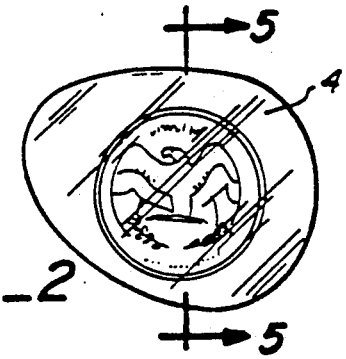
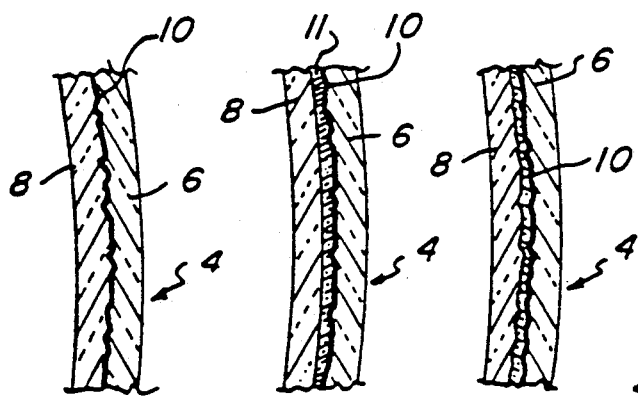
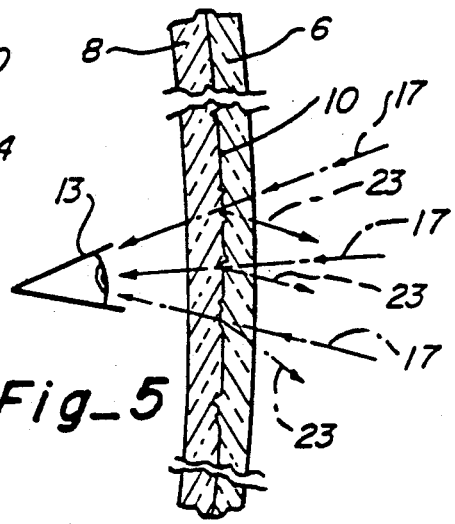
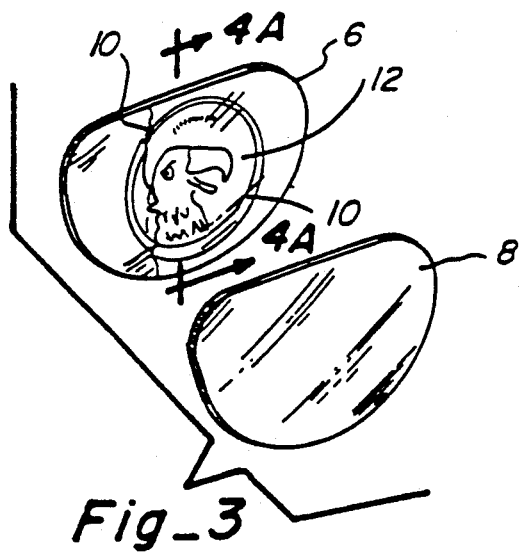
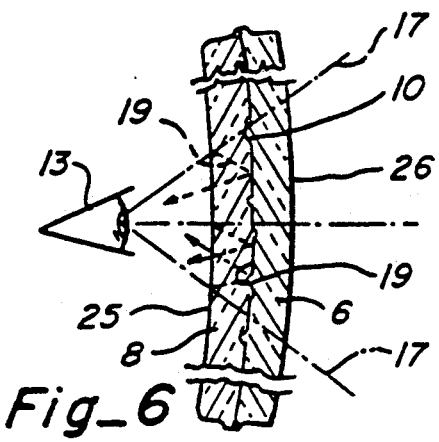

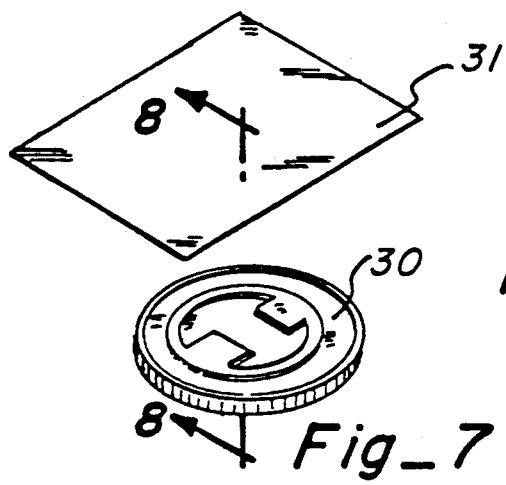
Fig_7
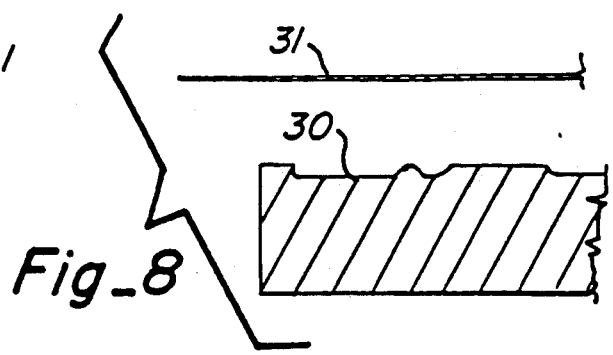
Fig_8
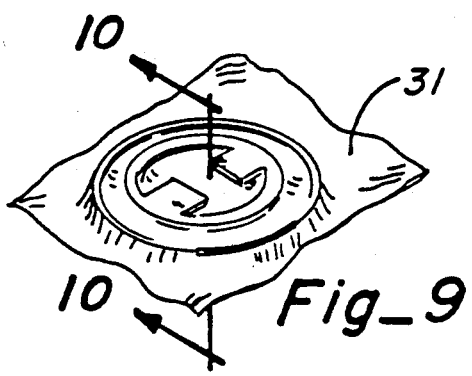
Fig_9
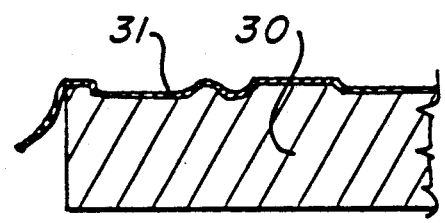
Fig_10
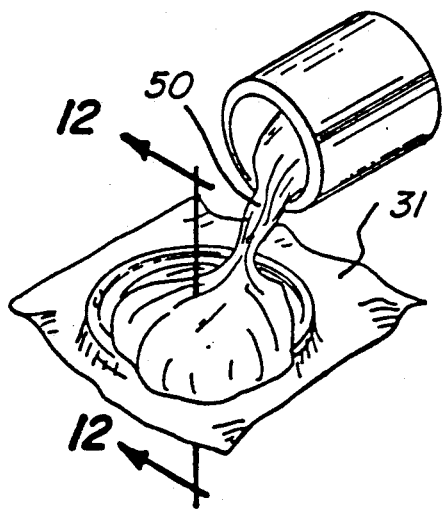
Fig_11
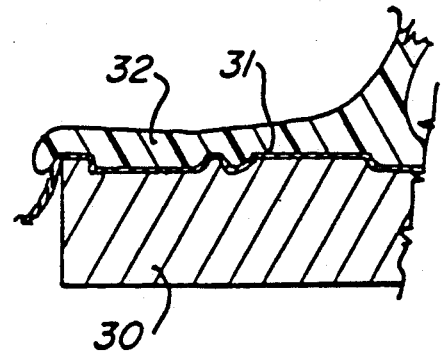
Fig_12

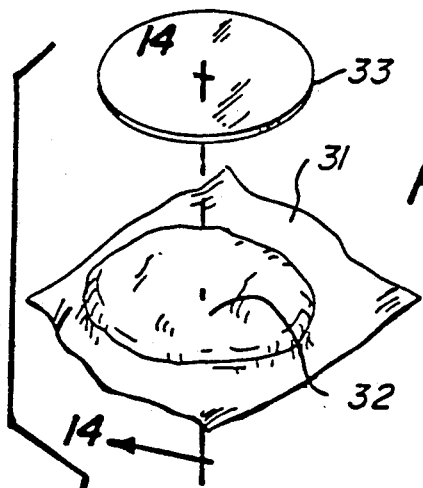
Fig_13
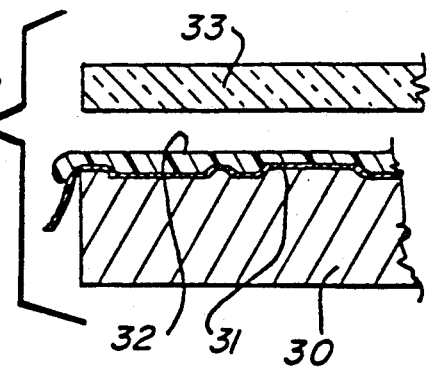
Fig_14
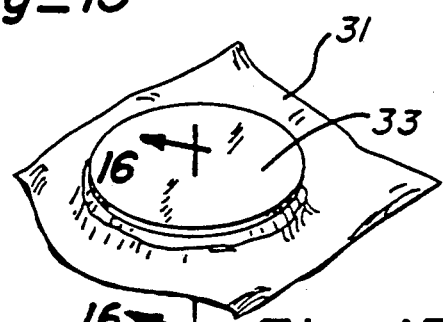
Fig_15
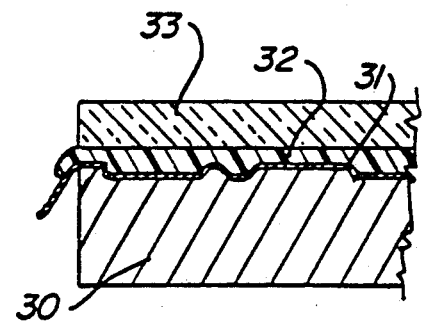
Fig_16
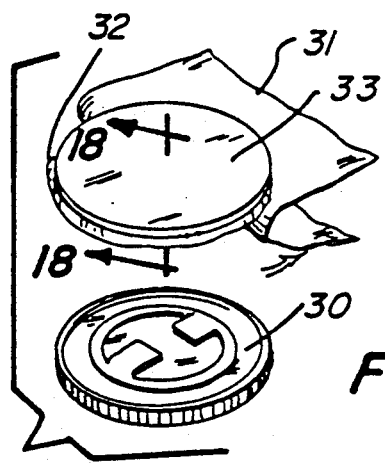
Fig_17
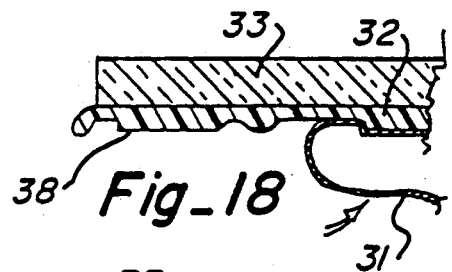
Fig_18
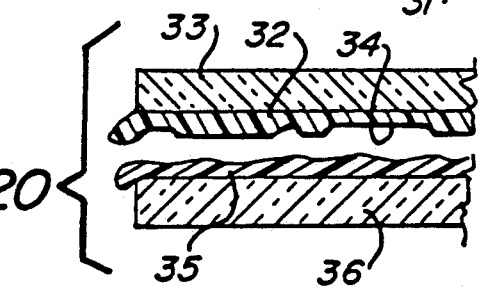
Fig_20
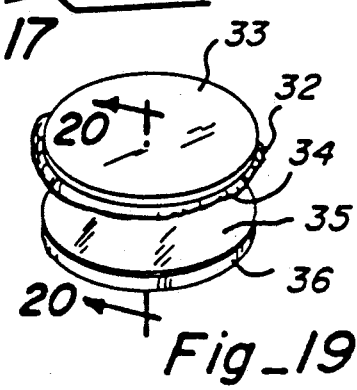
Fig_19
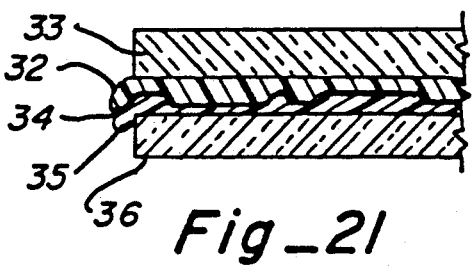
Fig_21

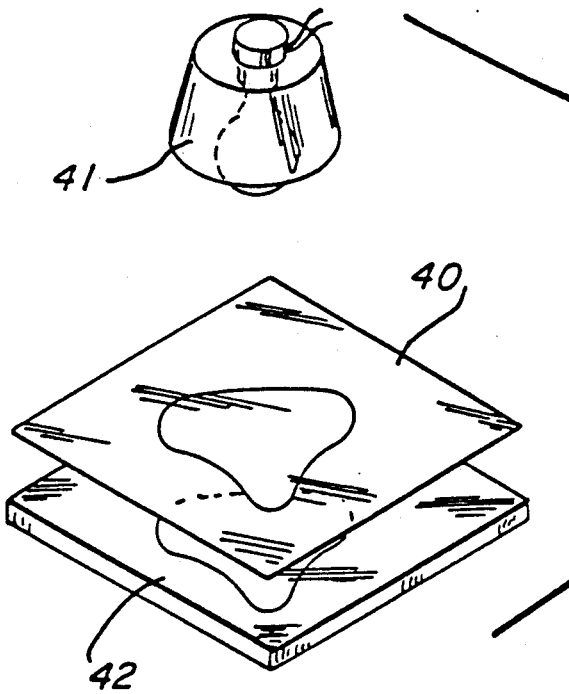
Fig_22
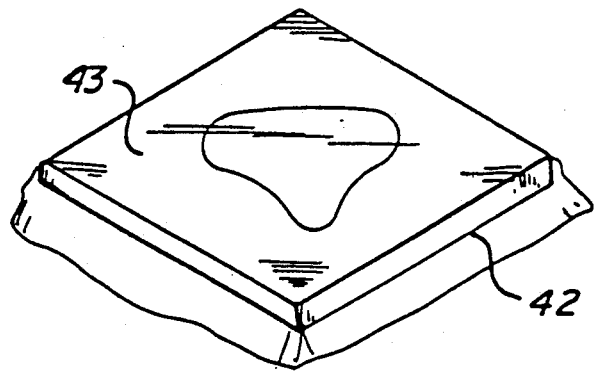
Fig_23
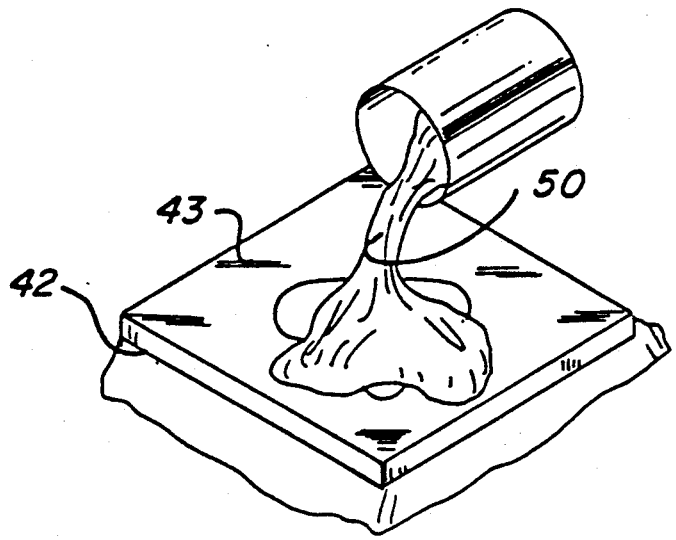
Fig_24

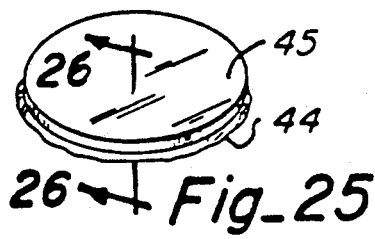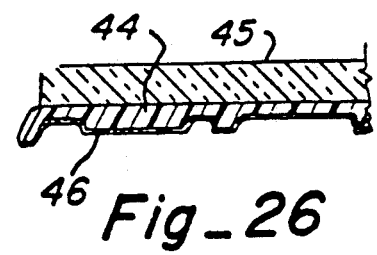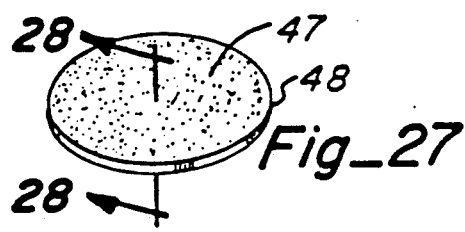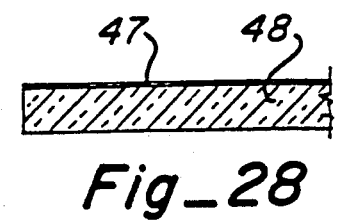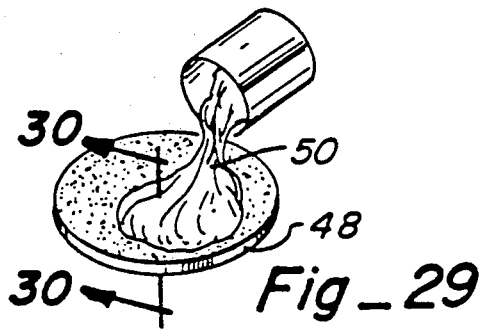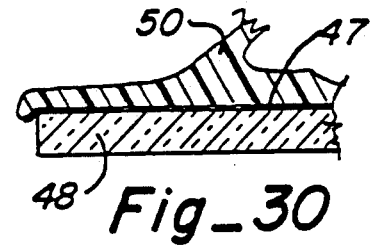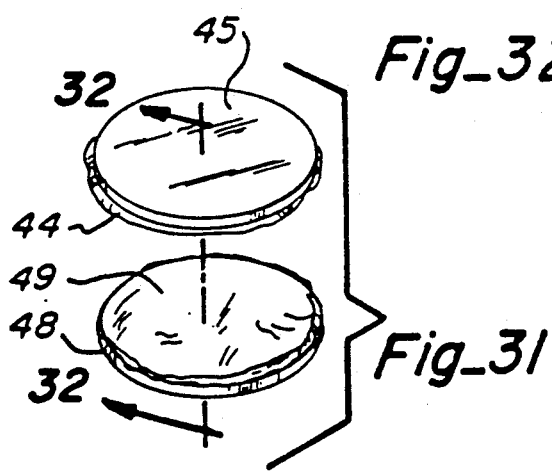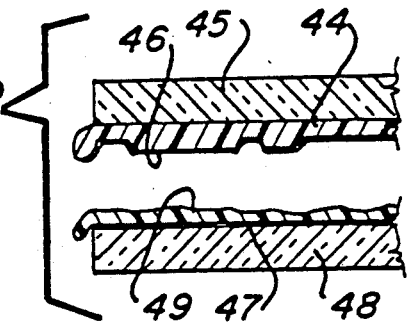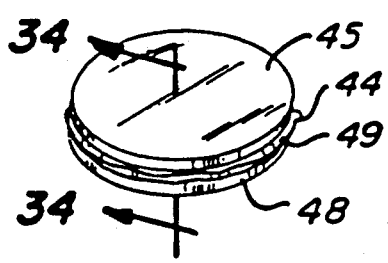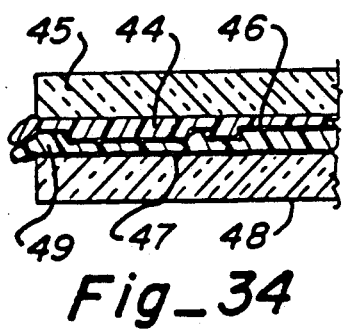

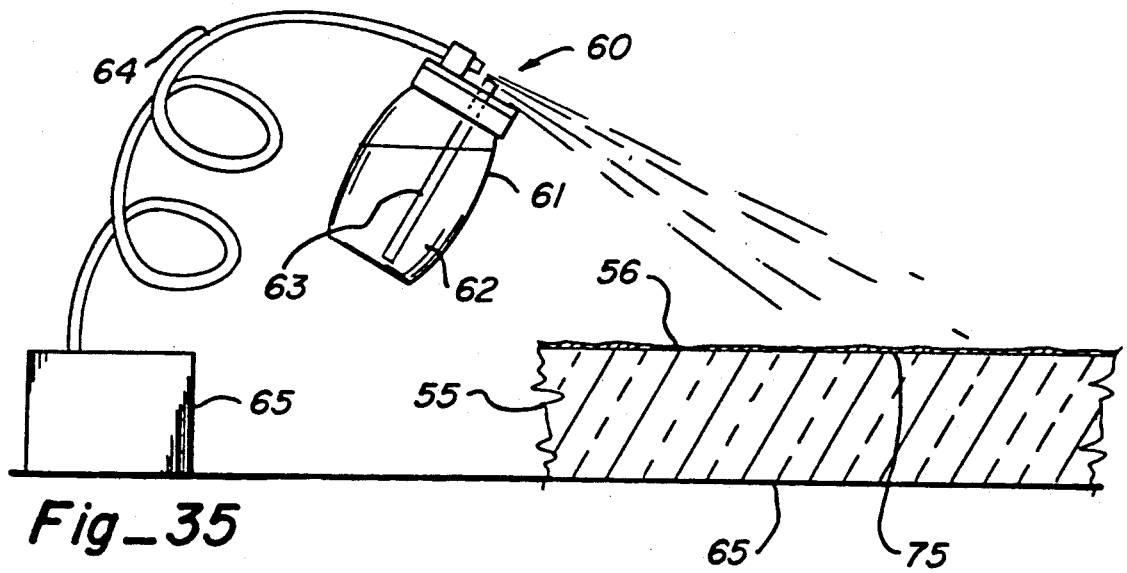
Fig_35
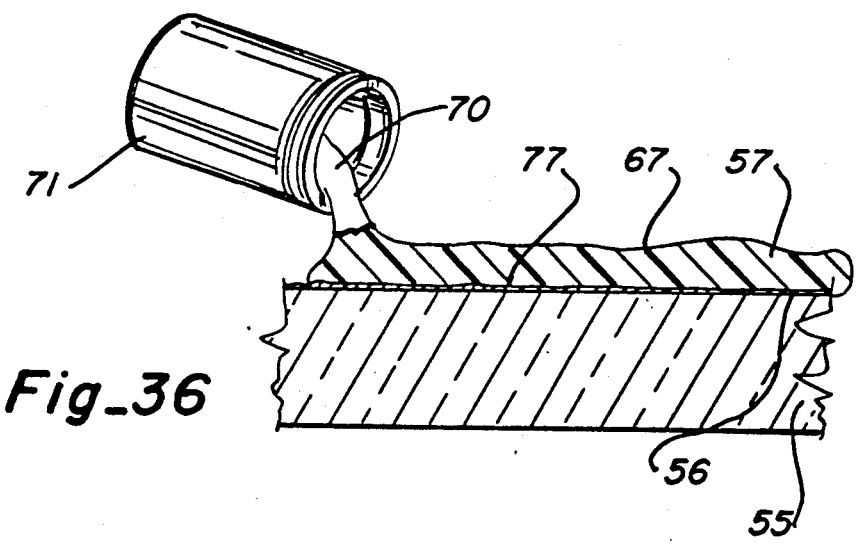
Fig_36
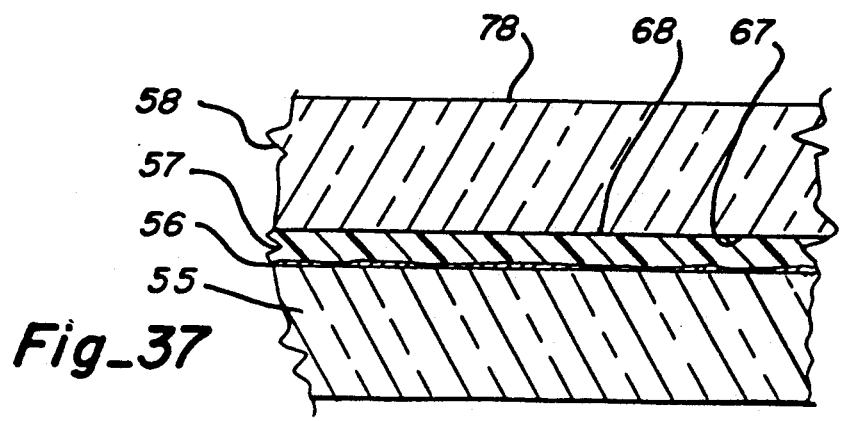
Fig_37

LAMINATED BEAM SPLITTING OPTICAL SYSTEM WITH REFLECTIVE MEDIUM

This application is a continuation-in-part of application Ser. No. 07/540,575, filed June 15, 1990, which is a continuation of U.S. application Ser. No. 07/362,691 filed June 7, 1989, now U.S. Pat. No. 4,934,792, to the same inventor.

BACKGROUND OF THE INVENTION

The present invention relates primarily to optical systems and the method of making the same where laminated light transmitting plates are made capable of reflecting from one side of the laminate a three-dimensional image fixed in one of the plates while transmitting coherent light waves through the entire body of the laminate.

An eyeglasses lens with somewhat similar results, but in only two dimensions, is the subject of prior Letters Patent, but the present invention offers not only the reflective image with three-dimensional and bas relief depth but accomplishes the result with greater simplicity and effectiveness than the prior art.

The most pertinent prior art on the subject appears to be U.S. Pat. No. 4,715,702 disclosing a structure for providing a decorative pattern over the surface of sunglasses. The structure combines a positive, two-dimensional, decorative pattern imprinted on a first lens layer, a reflective layer, and a third layer incorporating a negative decorative pattern. The decorative pattern is apparent to an observer as a flat image, but the negative pattern cancels the image for the wearer who then sees only a uniform color or hue that does not interfere with his vision or cause a distraction.

Other patents which disclose eyeglasses where characters or symbols are applied to the lens surfaces are U.S. Pat. Nos. 4,329,378; 4,145,125 and 2,281,101. The disclosures of these patents are not considered pertinent to the present invention except for a vague similarity of purpose.

Laminated and coated lenses for preventing glare, such as found in U.S. Pat. Nos. 2,675,740; 2,230,009 and 4,320,939 share some of the structural aspects of this present invention but do not teach its methods or the same details of structure.

The invention also relates to the manufacture of colored optical glass. Such glass is frequently used as colored filters or as architectural glass.

In the past, color in glass has been produced in several ways. For example, color can be achieved by the choice of raw materials used in the glass-making solution. For example, copper or cobalt compounds are used to produce blue glasses.

Color can also be achieved by separation of finely divided particles of material from the clear melt in the glass melting furnace. For example, using this technique, gold, copper, or cadmium sulfide produce ruby glass.

Both of the above techniques require precise batch formulations of raw materials. The coloring process also occurs during the melting step associated with glass formation. Thus, the glass, in practical terms, is colored in large batches. Often, the exact hue and saturation desired is difficult to achieve as well as predict.

Colored optical glass is frequently used as colored filters in optics and photography. Colored filters include filters made in several forms, including glass filters and gelatin film.

Colored glass filters are made using the processes described above for coloring glass. Thus, the glass is colored in large batches in the melt process and exact hue and saturation are difficult to achieve.

Dyed film filters are made of dyed gelatin, cellulose esters, and other plastics. The greatest variety is in the form of gelatin film. These filters are prepared by coating a previously determined thickness of gelatin containing the necessary dyes upon plate glass and, after drying, stripping the gelatin film off the glass. Gelatin filters mark and scratch very easily and thus are frequently cemented between flat plates of glass. Again, as the gelatin is dyed in batch form, the exact hue and saturation is hard to predict.

Glass can also be painted a desired color although the inherent unevenness of a painted layer can result in optical distortion. This is particularly true when the paint is applied by a spray method, as it is difficult to achieve a uniform coat.

Glass coatings are also well known and, in particular, it is known to provide an element with a layer of fluorescent material to absorb certain wavelengths of light. Such is shown in U.S. Pat. No. 4,320,939 to Mueller. The fluorescent coating is applied by a solution or coating composition, or is contained in a transparent sheet or film. The Mueller reference avoids reflection problems associated with distortion by keeping the fluorescent layer sufficiently thin.

It is therefore the primary object of this present invention to provide an optical system that transmits coherent undistorted light images while at the same time producing a three-dimensional image to an observer by means of the light reflected from an interior contoured surface of one of the layers of the system assembly.

A second object of the invention is more universal, actually leading to the first objective. That objective is to provide a method whereby a scratched or otherwise surface-distorted light transmitting plate may be reconstituted, without surface reclamation or alteration, to pass coherent light waves without the scattering effect produced by the surface distortion. The light transmitting plate may be in the form of a multi-layered structure, wherein one of the layers of the structure has the scratched or distorted surface.

It is another object of the invention to provide a method for contouring the surface of a hardenable plastic layer and then securing the hardenable layer to a light-transmitting plate. The hardened layer and light-transmitting plate are part of an optical system that transmits coherent undistorted light images while at the same time producing a three-dimensional image to an observer.

A further object of the invention is to provide a novel lens assembly that substantially eliminates secondary light reflection within the lens without the use of outside surface anti-reflective coatings, at least over the portion of the lens having a light scattering surface formed into the interior of the lens system for image reflection purposes.

A further object of the present invention is to provide a lens structure of the type described which lends itself to construction from plastic components which can be dipped to create gradation tinting, especially for use when the lens is applied to sunglasses.

It is an additional object of the instant invention to provide colored optical glass in which the hue and saturation of the color can be controlled.

It is a further object of the invention to provide colored optical glass wherein each desired piece can be individually colored using a spray paint technique with minimal optical distortion.

It is an additional object of the invention to provide a technique for substantially removing the optical distortion created when plate glass is painted with transparent paint.

Other and further objects, features and advantages of the invention will become apparent upon a reading of the detailed description of a preferred form of the invention which follows. It will also become apparent that the optical system of the present invention, while useful with lenses, can be employed in a large number of different applications which are not lens related, including building windows, vehicle windows, semi-transparent mirrors, closed circuit television discrete enclosures, furniture tops and displays.

The detailed description of the invention is directed toward applying the invention to sunglasses.

SUMMARY OF THE INVENTION

The practical aspects of the invention, as will be explained in more detail later and which may be embodied in sunglasses or other forms of optical systems, are actually based upon a more fundamental discovery in the optical field.

It has been found that a light transmitting plate, such as a glass plate, for example, which has a scratched or sculptured surface may be reconstituted to a surface where light is transmitted therethrough as a coherent beam, making objects seen through the glass appear clear instead of distorted. The reconstitution does not involve physical remedial alteration of the light scattering distortions on the original plate surface. The modification involves only the filling in of the scratches, contours and perturbations (the interstices) of the light distorting surface with a hardenable plastic material having the same or a very similar index of refraction to that of the material being repaired and, once filled in, to establish on the plastic material a smooth outer surface so that light being transmitted through that surface will not be scattered with resultant image distortion.

It has also been found that the scratched or sculptured surface, rather than being directly on the light-transmitting plate, can be on a first layer composed of the hardenable plastic. The scratched or sculptured plastic layer is then adhered to the light-transmitting plate. The scratches, contours, and perturbations of the light distorting surface of the first plastic layer after hardening are filled with additional hardenable plastic material to form a second plastic layer. Both plastic layers inherently will have the same or very similar index of refraction. A smooth outer surface is established on the surface of the second plastic layer so that light can be transmitted without resultant image distortion.

The scratches, contours and perturbations on the first plastic layer can be achieved by molding the hardenable plastic (in its liquid form) over a contoured object. The contours and perturbations of the chosen object will then be transferred to the hardenable plastic layer. Alternatively, the chosen object can be photographically etched plate having scratches or grooves corresponding to a photographic image. The hardenable plastic can be conformed to the scratches, grooves or topography of the etched plate.

The hardenable plastic filler material can be a state of the art clear liquid optical adhesive with a low enough viscosity to completely fill in and occupy the interstices of the chosen object and/or of the irregular light distorting surface. While the viscosity of such a material may be conducive to a self-leveling flow before curing, this alone cannot produce the smooth surface required for the transmission of undistorted light. Accordingly, it is beneficial to actually produce the smooth surface of the viscous fluid filler by placing next to it in adhesive relationship a clear piece of transparent material, such as a glass plate or lens piece, which has at least one smooth surface which will become the outer surface of the laminate or sandwich structure created by a first glass plate, the one or more layers of intermediate adhesive and a second plate of glass or lens piece.

Having then discovered that the so-called scratched or sculptured glass plate or the sculptured or contoured plastic layer can be made to transmit an undistorted image by the foregoing process of filling in and then backing the inner filler layer with another clear plate, it has also been discovered that the sculptured surface (of the first plate) can again be made to be seen, or recreated, by adding to that surface a reflective material. If the reflective material is very thin, such as in the order of microns, it can be made semi-transparent. That is, light will pass through the reflective material in a substantially coherent manner even though it may have a different index of refraction than the plates of glass or adhesive. Depending upon the thickness of the reflective material and its other characteristics, it will reflect some of the light passing through the sandwich, which reflections will portray the image of whatever sculpturing or surface distortion is present in the first plate or first plastic adhesive layer.

The image reflected can be variably colored by applying a selectively colored coating to one of the surfaces of the second plate of the sandwich structure.

The present invention therefore involves not only the discovery of how to reconstitute or restore a light scattering or translucent surface into a coherent light transmitting system, it involves practical applications where such a structure is combined with the reverse of that teaching to produce desired reflections which are a function of purposeful distortion or sculpturing of one of the light transmitting surface of the assembly.

Almost by definition, when deliberate distortion of the surface is done, a three-dimensional surface topography is the result. Accordingly, a variety of three-dimensional portrayals, including bas relief, can be the subject of the reflective image to be seen by an outside observer in the sunglasses lenses of the present invention. The image of the faces of a silver dollar coin is an example. Using a coin as exemplary of other similar impression-creating devices or objects, one embodiment of the invention can be summarized as including a first lens portion or plate having the traditionally polished outside surface but whose inside surface is molded in the image of one face of the coin. On this irregular bas relief surface is deposited a micro-thin reflective film, such as gold or the sculptured plate itself may be tinted to provide a reflective medium. A second lens plate is laminated to the micro-thin reflective layer or to the plate having the embedded tinting, creating, in the first case, a sandwich structure wherein the surface topography of the middle micro-thin reflective layer corresponds to, and is a counterpart of, the three-dimensional bas relief surface of the object to be portrayed, as the coin's face in this example.

A second preferred embodiment includes a first hardenable plastic layer which is contoured or embossed by molding over the relief image or object to be copied. The first contoured plastic layer is laminated to a first lens plate. On the contoured surface of the plastic layer is deposited a micro-thin reflective film. A second hardenable plastic layer is deposited over the micro-thin reflective film. This second layer fills in the interstices or contours formed in the first plastic layer. A second lens plate is laminated to the second plastic layer to create a sandwich structure in which the surface contours of the micro-thin reflective layer correspond to the contours of the object portrayed.

A third further embodiment uses a photographic image as the object to be portrayed. In this embodiment, the first contoured and sculptured plastic layer can be made by molding on a plate that has been photographically etched. The visible contoured surface will then correspond to the selected photographic image. In this embodiment, color or even a photo emulsion can be selectively applied to one of the surfaces of the sandwich structure. The contoured and sculpted plastic layer is laminated to a first lens portion. A second plastic layer fills the perturbations and interstices of the contoured surface. A second lens plate is laminated to the surface of the second plastic layer forming a sandwich structure, as in the preceding example.

In all embodiments, the outside surfaces of the first and second lens portions are smooth and are parallel to one another, unless the lens is intended to be a power lens in which case one such surface is made convex or concave to meet an optometric presciption, including bifocals. It should be noted that opposing non-parallel outside lens surfaces do not affect the bas relief reflection, except for the magnification or diminution produced by the lens. The reflection is only a function of the inner reflective surface or tinting medium of the laminated structure.

The laminated lens structure acts as a beam splitter, accommodating transmission through the lens of coherent undistorted light from objects to be seen through the lens and reflecting scattered light from the bas relief image of the object whose surface impression was fixed on the inside surface of one of the optical elements and made reflective by a reflective medium. The color or colors of the reflected image will depend on the material used as the intermediate laminate or reflective layer between the anterior and posterior plates or the color of the reflected image may be controlled by the color tinting of one of the plate itself or by the inclusion of an actual photo emulsion against the reflective layer, for example against a reflective layer of evaporated aluminum, producing a white paper appearance against which the photo color or photo emulsion is placed.

The instant invention also relates to colored optical glass comprising a plurality of layers. In the simplest form, a first plate-like transparent member has a thin layer of paint on one of its surfaces. The paint can be applied by air brush or any other well known method. Inherent in the application of the paint is variations of coverage which result in optical distortions. A hardenable plastic layer forms the next adjacent layer to the paint. In liquid form, the plastic fills any variations, unevenness and perturbations in the paint layer. A second plate-like transparent member is applied directly to the plastic in adhering relationship. The layers form a colored laminated structure of optical glass with minimum optical distortion. The index of refraction of the hardenable plastic is substantially similar to the index of refraction of the two plate-like transparent members.

The instant invention further contemplates the method of coloring optical glass. The method includes applying a layer of transparent paint to a plate-like transparent member. To correct distortion, the method includes filling any variations in the paint layer with a hardenable plastic, and adhering a second plate-like transparent member directly to the plastic layer. The second transparent member becomes the outside surface of a laminate formed by the first transparent member, the paint layer, the plastic layer, and the second transparent member.

DESCRIPTION OF THE DRAWINGS

FIG. 1 is a perspective view of the lenses of the present invention as applied to sunglasses.

FIG. 2 is a front elevational view of a single lens of the present invention showing the reflected bas relief image as it would appear to an observer.

FIG. 3 is an exploded view of the lens of the present invention showing the sculptured inside surface of the anterior lens plate and the posterior lens plate.

FIG. 4 is an enlarged fragmentary cross-sectional view similar to that of FIG. 5, except that the elements of the construction are enlarged out of proportion to adequately illustrate three different methods of producing the lens.

FIG. 4A illustrates a construction where the anterior plate of the system has been injection molded with the bas relief sculpturing molded into the said plate and where the posterior plate is cast directly against the reflective coating which was applied to the inner sculptured surface of the anterior plate. The reflective coating is shown by the dark line between the lens plates.

FIG. 4B illustrates a construction where the posterior lens is not sculptured to fit against the inner surface of the anterior lens plate, but is smooth on both sides and is adhered to that anterior lens plate by a clear adhesive, which adhesive has a light refraction index similar to that of the lens plate. This figure illustrates the basic discovery of the invention, where the distorted inner surface of one plate, the anterior plate in the drawing, is made to transmit coherent light images by the use of the clear adhesive and a second, or posterior plate, having at least an outside smooth surface. This figure also diagrammatically illustrates with the darkened interior line the use of the semi-transparent reflective material.

FIG. 4C illustrates a method of construction whereby the posterior lens plate is contoured to be a mating counterpart of the anterior plate and is attached thereto by a means of clear adhesive with a similar index of refraction. The micro-thin layer of reflective material is shown coated to the inner surface of the anterior plate and illustrated by a heavy dark line.

FIG. 5 is a fragmentary cross-sectional view taken along lines 5—5 of FIG. 2, showing diagrammatically the light beams which enter the lens and which are transmitted to the eye of a wearer of the sunglasses, and showing that portion of the light beam which is reflected by the inner reflective film which is coated on the inner surface of the anterior lens plate. Other reflections than those illustrated also occur within both halves of the lens.

FIG. 6 is a view similar to FIG. 5, except that the light beams which are depicted as entering the lens are shown as being reflected by the outside surface of the posterior lens plate and then re-reflected by the reflective interior micro-thin coating in order to scatter the reflected light and avoid double images to the eye of the wearer.

FIG. 7 shows an object to be portrayed or copied and a foil layer to be contoured or embossed over the object.

FIG. 8 is an enlarged cross-sectional view of the object to be portrayed and the foil taken along lines 8—8 of FIG. 7.

FIG. 9 is a perspective view showing the object to be portrayed covered with the foil layer.

FIG. 10 is an enlarged cross-sectional view taken along line 10—10 of FIG. 9.

FIG. 11 is a perspective view showing the molding of a first plastic layer.

FIG. 12 is an enlarged cross-sectional view taken along line 12—12 showing the plastic layer.

FIG. 13 shows the assembly of a first lens plate and the contoured plastic layer.

FIG. 14 is an enlarged cross-sectional view taken along line 14—14 of FIG. 13.

FIG. 15 is a perspective view of the contoured plastic layer and the first lens plate laminated thereto.

FIG. 16 is an enlarged cross-sectional view of the layers of FIG. 15 taken along line 16—16 of FIG. 15.

FIG. 17 shows the removal of the foil sheet and the portrayed object.

FIG. 18 is an enlarged cross-sectional view taken along line 18—18 of FIG. 17.

FIG. 19 is a perspective view of the optical components of the sandwich structure.

FIG. 20 is an enlarged cross-sectional view taken along line 20—20 of FIG. 19 showing a first lens plate laminated to the first hardened contoured plastic layer, and a second soft plastic layer on a second lens plate.

FIG. 21 is an enlarged cross-sectional view of the optical sandwich structure of FIG. 20. A micro-thin reflective film is also shown over the contoured surface.

FIG. 22 is an exploded view of an exposing system used for making a photographically etched plate.

FIG. 23 is a perspective view of the etched plate having an image thereon and where the etched plate is covered with foil. (The foil is shown as transparent to better reveal the etched plate.

FIG. 24 is a perspective view showing the molding of a contoured plastic layer on the etched plate.

FIG. 25 is a perspective view of the contoured plastic layer and the lens plate laminated thereto.

FIG. 26 is an enlarged cross-sectional view taken along line 26—26 of FIG. 25.

FIG. 27 is a perspective view of a second lens portion selectively covered with a transparent type paint.

FIG. 28 is an enlarged cross-sectional view taken along line 28—28 of FIG. 27.

FIG. 29 is a perspective view showing the pouring of a second hardenable plastic layer on the painted second lens portion.

FIG. 31 shows the optical components, including the micro-thin reflective layer, just prior to being sandwiched together.

FIG. 32 is a cross-sectional view of the optical components taken along line 32—32 of FIG. 31.

FIG. 33 is a perspective view of the completed sandwich structure.

FIG. 34 is an enlarged cross-sectional view of the sandwich structure taken along line 34—34 of FIG. 33.

FIG. 35 shows the application of a layer of transparent paint to a plate-like transparent member. The figure is partially enlarged, partially in cross-section, and not drawn to scale.

FIG. 36 is similar to FIG. 35 and further shows the application of a hardenable plastic layer. The figure is partially in cross-section, partially enlarged and not drawn to scale.

FIG. 37 is an enlarged cross-sectional view of the resultant laminated structure with the addition of a second plate-like transparent member.

DETAILED DESCRIPTION

An example of sunglasses 2 having the novel lenses 4 of the present invention is seen in FIG. 1 of the drawings. Each of the lenses 4 comprises a laminated sandwich consisting of a front, or anterior, lens plate 6, a rear, or posterior lens plate 8, the latter of which takes its position on the inside of the total lens structure next to the eye of the wearer, and a micro-thin layer 10 disposed between the anterior and posterior lens plates 6 and 8.

The bas relief object which is chosen to be imaged by reflected light is used as a casting surface for forming the topography of the interior face 12 of one of the lens plates, the anterior plate 6, as seen in FIG. 4, is shown as an example. The surface irregularities and undulations which form the contour of the pattern object are transferred directly to the interior face 12 by the process of casting or molding the lens plate 6, which can be of glass or a plastic material.

To the topographically contoured surface of the interior face 12 of the anterior lens plate 6 is added, by well-known deposition methods, the micro-thin layer 10 of a light reflective material, such as gold. In place of a deposited reflective inner layer, one of the lens plates itself can be tinted to provide a similar result.

Several methods would be suitable for formulating the posterior lens plate. One such process is to cast it directly against the interior reflective coated surface 12 of the anterior lens plate 6 as shown in FIG. 4A. It is to be understood that anterior and posterior designations are exemplary only and a reversal of the parts will produce the same result.

A second method involves separate injection molding of the posterior lens plate with its inside or front facing surface molded so as to provide a matching surface fit with the inside or rear facing surface 12 of the anterior lens plate 6 as shown in FIG. 4C. By a matching surface fit, it is meant that the peaks and valleys of one surface are counterparts of the peaks and valleys of the mating surface of the other plate. The contoured posterior plate 8 is then laminated to the anterior plate with a clear adhesive 11.

The methods illustrated in FIGS. 4A and 4C are essentially similar in result and differ only in the actual method of manufacture and fabrication.

A third method of construction yields yet another variation in the product. The posterior lens plate can be smooth on both of its opposing surfaces and laminated to the irregular coated inside surface 12 of the anterior plate 6 with an adhesive 11 which will fill the irregularities of the inside surface 12 of the anterior plate 6 and form an interface between the anterior and posterior plates as shown in FIG. 4B, resembling, except for the presence of the reflective medium, the structure of the basic parental discovery of the present invention.

Obviously, the construction of the FIG. 4B embodiment is the simplest and least expensive because the second plate does not receive the same sculpturing as the first plate received. The FIG. 4B method, however, would not be practical when the light refractive index of the adhesive layer 11 cannot be matched to the refractive index of the anterior and posterior plates 6 and 8. With a mismatch of indices, it then becomes important to reduce the thickness of the adhesive layer to the absolute minimum in order to reduce the distortion produced by the mismatch of the indices of refraction. The more equal the index of refraction of the plastic adhesive layer 11 is to the index of refraction of the plates 6 and 8, the thicker the layer may be. On the contrary, if the indices are not equal, then the thickness of the layer 11 must be thinner, creating at the extreme the necessity for the second plate 8 to have the same topography, but in reverse or negative, to that of the inner surface 12 of the anterior plate 6, that is, an inverse relationship exists between the match of the indices and the thickness of the plastic layer 11. The greater the mismatch, the thinner the layer. The embodiments shown in FIGS. 4A and 4C will accommodate a very reduced thickness of adhesive layer. It should be noted that the adhesive layer of FIG. 4C is diagrammatic only and is not intended to be shown as proportionate in its thickness to the adhesive layer of the FIG. 4B construction.

Regardless of the method of joining the two plates of the lens 4, a light beam 17 which enters the lens 4 will be split at the point of incidence with the reflective film 10, a portion of the light passing as coherent light through the film 10 to the eye 13 of the wearer, and a portion 23 of the total light energy being reflected by the irregular surface of the imaging topography formed by the coating 10 on the inside surface of one of the lens plate. The reflected portion of the light 23 will produce the bas relief image of the casted object in the eye of an observer looking at the lens from the front side.

Even though it is pointed out that one plate of the lens system does not necessarily need to be the sculptured counterpart of the first in order to obtain the light beam splitting phenomenon of the inventive structure, it is necessary that there be a second plate as the outside layer of the sandwich construction. The outside plate, even though smooth on both sides, functions to re-focus the light waves to produce the coherent image of the transmitted light.

In speaking of three-dimensional objects or patterns fixed to the inside of the lens, it is to be understood that the bas relief produced by the face of a coin is only one example. Etching of the inside surface of one of the plates by scratching or similar methods would also produce a three-dimensional image, corresponding to the depth of the abrasion.

In addition to reflecting the bas relief image, the interior layer 10 serves another useful purpose by eliminating the need for anti-reflective coatings, such as magnesium fluoride, to be placed on the outside surfaces of the lenses. As seen clearly in FIG. 6, a portion 19 of the light energy 17 entering the lens and passing through the film 10 will be reflected back into the lens by its rear facing exterior surface 25. Normally, this reflected light 19 will then be re-reflected from the forward facing exterior surface 26 of the lens, producing distracting images or hot spots to the wearer. In the construction of the present invention using a roughened, light-scattering surface, the irregular surface of the reflecting film 10 acts to scatter and re-reflect the light 19, producing no image to the wearer and eliminating the need for an anti-reflective coating on the exterior surfaces 25 and 26 of the lens.

A further method for making the optical laminate sandwich is shown in FIGS. 7 through 21. In FIG. 7, element 30 is the object to be portrayed, which can be a coin or any three-dimensional article. The object 30 is covered with a foil sheet 31 as shown in FIGS. 8, 9 and 10. The sheet 31, though preferably of metal foil, can be of any material which will allow it to be later peeled or rolled off the object and off a subsequently placed hardened plastic layer. The sheet 31 is contoured over the object to be portrayed 30 so that the sheet 31 is embossed with all the surface irregularities and undulations of the object to be portrayed 30 (see FIGS. 9 and 10).

A fluid, hardenable plastic material 50 is then poured over the foil sheet 31 as shown in FIGS. 11 and 12. The plastic material or adhesive 50 can be any light transmissive plastic such as an acrylic, polyester or a poly-carbonate composition with a low enough viscosity to conform to the contours and interstices of the foil sheet 31 and of the object 30. The material 50 should form a fairly thin layer 32, but thick enough to accommodate the contours and depth of image of the object. A flat or curved lens plate portion 33 is then lightly pressed onto the uncured and still liquid plastic layer 32, as shown in FIGS. 13–16, which adheres to the plastic material in its softened or viscous state. The lens plate portion can be a clear piece of transparent material, such as glass or any eyeglass lens portion which has at least one smooth surface. In this embodiment, it is not necessary that the index refraction of the lens plate portion 33 be the same as or near that of the plastic layer 32.

After adhering the lens plate portion 33 to the plastic material, the resulting sandwich, shown in FIG. 16, is cured by any well-known means, such as ultraviolet light.

After curing, the object 30 is removed and the foil layer 31 is peeled or rolled from the hardened plastic layer 32 as shown in FIGS. 17 and 18. The sculptured surface 38 of the hardened plastic layer remains contoured in the image or reverse image of the removed object 30. On this sculptured or bas relief surface 38 is deposited a micro-thin reflective layer 34 as shown in FIG. 20. A second hardenable plastic layer 35, similar to the first layer 32, is applied by pouring onto a second lens plate portion 36. The second plastic layer 35 is sandwiched (along with lens plate portion 36) next to and abutting the reflective film 34 (FIGS. 19 and 20). Thus, the viscous plastic 35 fills the contours and interstices of the reflective film 34 and its plastic layer backing 32 to achieve a laminated sandwich structure as shown in FIGS. 21. Alternatively, the second plastic layer could be poured directly onto the reflective film surface and the second lens portion adhered thereto.

After curing, layer 35 will harden into the contours and interstices of the reflective film 34. The surface topography of the micro-thin reflective layer corresponds to, and is a counterpart of, the three-dimensional bas relief surface of the object to be portrayed. The sandwiched lens structure of FIG. 21 can be used as a sunglasses lens as described above. The reflective material layer will reflect some of the light passing through the lens sandwich and such reflections will portray the image of whatever sculpturing or surface distortion is present in the first plastic layer.

FIGS. 22-34 illustrate another embodiment which, although similar to the pervious embodiment, differs in the method for achieving the first sculptured or contoured plastic layer.

FIG. 22 illustrates an exposure system used to photographically etch a plate. A light source 41 exposes a high-contrast negative 40 which is placed on the plate 42 to be etched. The plate 42 is coated with a photosensitive emulsion. The emulsion that is not contacted by the light (that is, the emulsion that is on areas covered by the dark portions of the negative) will be washed away after exposure. These areas will then be subject to etching when the plate 42 is placed in an acid bath, forming on the plate a carved surface 43 in the image of the negative, as shown in FIG. 23. The etched plate becomes, in this embodiment of the process, the same item as the object 30 of the embodiment already described and illustrated in FIGS. 7 et seq. Similar to the process of the said previous embodiment, a foil 31a is pressed into the contoured surface 43 of the plate 42, as shown in FIG. 23, and a hardenable plastic or optical laminate material is poured onto the foil, as shown in FIG. 24, similar to that same part of the previously described process, as shown in FIGS. 11 and 12. The foil 31a is shown in FIGS. 22-24 as transparent to better reveal the plate 42 and the contoured surface 43.

While the plastic material 50 is still liquid, an optical lens portion 45, which may be flat or curved in the manner of an eyeglasses lens, is pressed onto the plastic in the manner shown in FIGS. 13-16 and after curing the foil is removed in the same fashion as illustrated in FIGS. 17 and 18, producing the product of FIG. 25 where the cured plastic layer 44 has a sculptured surface contour compatible to the carved surface of the etched plate 42. Thus, a high contrast negative or transparency can be utilized as the image of an object to be portrayed by the bas relief surface of the plastic layer 44.

As in the previous embodiment, a micro-thin reflective layer 46 is then applied to the hardened contoured surface. If a color treatment is to be included in the optical sandwich, aluminum can be evaporated on the sculptured surface to form the microthin reflective layer 46. This will give the effect of a white paper finish on the bas relief surface. Other effects can be achieved by using foil or other reflective finishes.

A second lens plate portion 48 is provided as shown in FIGS. 27 and 28. To apply color image 47 to the inside surface of lens portion 48, a silk screening technique is used. This technique uses the same high contrast negative 40 as was used to etch the plate. Thus, the color applied will correspond to the etched photographic image in the plate 42. To apply the desired color, the high contrast negative or transparency is exposed onto photosensitive material. This material is such that the areas struck by light (corresponding to the clear areas of the negative) will polymerize. The nonpolymerized areas (corresponding to the dark portions of the negative) will wash away. While still wet, the material is adhered to a stretched screen and will act as a stencil or mask for the application of color. Thus, the color applied through the screen will correspond to the photographic image, which in turn corresponds to the bas relief surface contoured in the plastic layer 44. The color applied can be in the form of any well-known transparent light transmission ink or paint. In place of silk screening a color image 47 onto the inside surface of the lens portion 48 with ink or paint, a satisfactory result may be obtained by laying down an actual color transparency.

A second layer 49 is created by pouring the hardenable plastic 50 over the color surface 47 of the lens portion 48 (FIGS. 29 and 30). Before hardening, the layer 49 is sandwiched onto the reflective coated bas relief surface of layer 44 as shown in FIGS. 31 and 32. Malleable layer 49 will fill the contours and interstices of the reflective bas relief surface 46. FIGS. 33 and 34 show the resulting laminated optical sandwich after curing. Such a sandwich can be used as a lens for sunglasses or the like.

The wearer of the glasses does not see an image of the pattern fixed in the lens because the light entering the lens from the rear, or from the wearer's side, is minimal and is darkened compared to the coherent light being transmitted through the lens which comes from sources in front of it. On the other hand, on the observer's side of the lens, there is significant light entering the lens and even a portion of that total light, which is reflected light, is sufficient to produce a clear image of the three dimensional object embedded in the lens structure and, if constructed with the color enhancement of the last mentioned embodiment, a colored bas relief image is presented to the observer.

Color is also important with respect to the embodiments of FIGS. 35, 36 and

FIG. 35 shows a plate-like transparent member (enlarged) having a relatively smooth exterior surface 55. The transparent member can be formed of either glass or plastic as is well known, although the preferred embodiment will be described with respect to a glass member. On a surface 75 of the transparent member 55, opposite surface 65, is applied a thin layer 56 of the desired transparent paint.

The color of the paint is chosen based on that desired for the entire laminated optical glass structure. The paint can be applied by any well known method, such as rolling or mechanical brushing, but in the preferred embodiment the paint is illustrated as being applied with an airbrush 60. The paint 62 is contained in reservoir 61 of the airbrush 60. The paint 62 passes through syphon tube 63. It is applied to surface 75 under the force of air passing from compressor 65 through hose 64.

No matter what well known method is chosen for applying the paint, it is inherent that difficulties will arise in achieving a uniform layer 56. Particularly when using an airbrush, variations will occur in layer 56. The variations and thickness illustrated are only representative and do not form a repeatable pattern. Different thicknesses and variations can occur depending on the skill of the applier and the consistency of the paint.

The variations in the paint layer 56 create optical distortion similar to the sculpting in the prior embodiments for one attempting to view through the plate 55. To cure the optical distortion, a third layer 57 of hardenable plastic is applied over paint layer 56 as shown in FIG. 36. The plastic material 70 is poured in viscous form from container 71. The plastic layer or filler material can be any suitable curable plastic as noted in the embodiments above, but preferably, it is a clear liquid optical adhesive with a low enough viscosity so that surface 77 of the plastic layer 57 will flow and completely fill in the variations and irregularities of paint layer 56.

While the viscosity of the plastic material may be conducive to self-leveling flow before curing, this alone cannot produce the smooth surface required for the transmission of undistorted light. Thus, a fourth plate-light transparent member 58 is applied so that surface 68 of the member 58 adheres to surface 67 of the plastic layer 57. Exterior surface 78 of medium 58 is smooth to transmit undistorted images as described above.

For maximum visual acuity, it is important that the indices of refraction of the two plate members 55 and 58, and plastic layer 57, be as similar as possible. Choosing the same index of refraction for layers 55, 57 and 58 greatly improves visibility. The index of refraction of paint layer 56 is not as critical because of the relative thinness of the layer. With increased thickness, the index of refraction of layer 56 should be chosen similar to the other layers.

The four layers form a resultant laminated optical glass structure as shown in FIG. 37. The entire structure will appear to be the color of the chosen paint. The hue and saturation can be controlled by the application of the paint layer. Thus, each piece of colored optical glass desired can be individually colored to desired specification. This avoids the large batches typically required in applying color during the melt process. The application technique of the paint can also produce graduated hues or patterns or pictures in a single piece of optical glass, if desired.

Additional embodiments of the invention characterized by the item of manufacture and the process just described may be easily made and constructed. For example, the paint layer can be applied to the inside surfaces 68 and 75 of both of the plates 55 and 58 and the optical adhesive layer 57 will perform in the same way to establish coherent light passage through the laminated layer. As disclosed above, a metallic coating can be applied to the inside surface 68 of the plate 58 to provide a colored background, such as white, to the coloration placed on the inside surface 75 of the first plate 55. For example, if the coloration on the plate 55 were in the form of a picture or image, the white coloration on the inside surface 68 of the second plate 58 would appear as a background color. The coloration can also be placed on the bas relief image described above.

The resultant laminated optical structure can be cut into the desired shape desired for use as a light filter or as a piece of architectural glass. Alternatively, transparent members 55 and 58 can be precut or selected for a desired shape and purpose.

It is noted that a similar process can be used to color optically clear plastic without visual distortion.

It is also apparent that the colored optical glass disclosed can be used for other purposes than filtering or for architectural glass. In general, it can be used anywhere it is desired to have a clear view through colored glass.

The method disclosed above for correcting an optical discontinuity or optical distortions in a laminated lens structure or sandwich can be applied to other layers included in the optical sandwich. For example, patterned glass or patterned transmissive plastic could be the layer with the surface irregularities or contours. Undistorted transmission could be achieved by mating the irregular surface to a corresponding glass or plastic layer.

I claim:

1. A colored optical structure comprising
   a first light transmitting plate member having a smooth exterior surface and an interior surface,
   a transparent paint layer on said interior surface of said first plate member,
   a flowable layer adhered to said paint layer, said flowable layer filling any variations in said paint layer and correcting any optical distortion produced by variations in said paint layer,
   a second light transmitting plate member having a smoother exterior surface and an interior surface adjacent said clear flowable layer.

2. The colored optical structure of claim 1 wherein said flowable layer is a viscous, hardenable plastic.

3. The colored optical structure of claim 1 wherein said first and second plate members are glass plates.

4. The colored optical structure of claim 1 wherein said first and second plate members have the same index of refraction.

5. The colored optical structure of claim 1 wherein said first and second plate members and said flowable layer have the same index of refraction.

6. The colored optical structure of claim 1 wherein said flowable layer is clear optical adhesive.

7. The colored optical structure of claim 1 wherein said layers form a laminate.

8. The method of coloring a light transmitting optical structure at least one desired color comprising
   providing a first light transmitting member,
   coating a surface of said first light transmitting member with a transparent paint layer at least one desired color,
   applying a flowable layer over said paint layer to fill in any variations in said paint layer and to prevent optical distortion resulting from any variations in said paint layer,
   securing a second light transmitting member to said flowable layer.

9. The method of claim 8 wherein said step of coating comprises applying said paint layer with an airbrush.

* * * * *